Aug. 30, 1932.                J. C. CROWLEY                1,874,914
                              VALVE MECHANISM
                             Filed Jan. 13, 1930

Inventor
John C. Crowley
Kwis Hudson & Kent
attys.

Patented Aug. 30, 1932

1,874,914

UNITED STATES PATENT OFFICE

JOHN C. CROWLEY, OF CLEVELAND HEIGHTS, OHIO

VALVE MECHANISM

Application filed January 13, 1930. Serial No. 420,368.

This invention relates to a valve mechanism which is particularly adapted for use in connection with valve stems for inner tubes of pneumatic tires although, of course, it may be used in other relationships.

An object of the invention is to provide a valve mechanism of the type which is adapted to be mounted upon the end of a standard valve stem and which is so constructed that it readily adapts itself to different valve stems so as to be properly positioned thereon.

Another object is to provide in such a mechanism a construction wherein the parts are so formed as to efficiently function with a minimum of wear.

Additional objects and advantages residing in the details of construction will become apparent herein as the description progresses.

Reference should be had to the accompanying drawing forming a part of the specification, in which.

As is well understood in the art, the standard valve stem is provided at one end with a head adapted to be arranged upon the inside of the tire tube, while the other end of the stem is reduced and is externally threaded to receive a dust cap or other internally threaded member. The standard valve stem is provided with a central bore, that portion of the bore within the reduced externally threaded end of the stem being larger than the remaining portion of the bore and being connected to such remaining portion by a tapered portion. Ordinarily, the enlarged portion of the bore is threaded so that a valve insides may be inserted in the stem, which insides has a packed part cooperating with the tapered portion of the bore. In view of the various types of wheels that are used on automobiles, it often occurs that the standard valve-stem is of insufficient length to give accessibility thereto for the purpose of inflating the tire or for testing the air pressure within the tire. It is, therefore, often necessary to provide a valve mechanism in the nature of an extension which may be secured upon the end of the valve stem.

Figure 1:
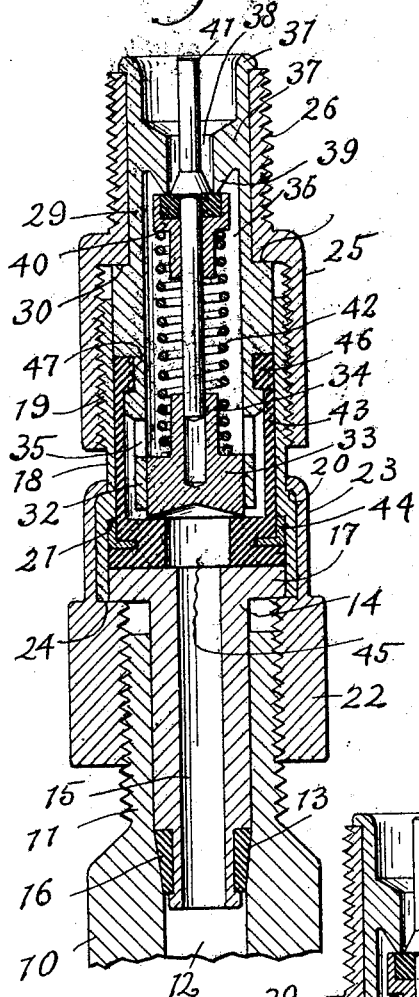
Fig. 1 is a sectional elevation with the valve mechanism in the closed position.

In Fig. 1 of the drawing, the valve stem is indicated at 10, while the enlarged portion of the bore is shown within the reduced externally threaded portion 11 of the stem, this enlarged portion being connected to the portion 12 of the bore by the tapered portion 13.

The valve mechanism of the present invention comprises an elongated positioning member 14 having a central bore 15 adapted to align with the bore in the valve stem and being provided at one end with a packing 16 cooperating with the tapered portion 13 of the valve stem bore to form an air seal and at its other end having an enlarged head 17. The purpose of the positioning member is, of course, to enable the mechanism to be used on different valve stems and to always position or centralize the mechanism with respect to the stem and to provide the required air-sealing fit between the mechanism and stem irrespective of the location of the tapered portion of the valve stem bore with respect to the end of the stem. A sleeve 18, externally threaded at its upper end 19, has its lower end fitting over the enlarged head of the positioning member. The sleeve 18 is provided with an external annular shoulder 20 and with an internal annular shoulder 21. An internally threaded nut 22 is adapted to be threaded upon the externally threaded reduced portion of the valve stem, this nut having an extension 23, the upper end of which is turned inwardly to engage over the external shoulder 20 of the sleeve so as to swivelly connect the nut and sleeve. An internal annular shoulder 24 is formed in the nut at the junction of the extension 23 and the main body of the nut and upon this shoulder rests the lower end of the sleeve 18 and the enlarged head of the positioning member, as clearly shown in the drawing. It is clear from this disclosure that when the valve mechanism is assembled upon the valve stem, the gasket 16 upon the end of the positioning member 14, will be moved longitudinally into cooperating contact with the tapered portion 13 of the bore of the valve stem because of the swivel connection between the nut and the sleeve 18, thereby obviating the wear upon the packing which would take place were the positioning member to be assembled in the valve stem by rotative movement.

Figure 3:
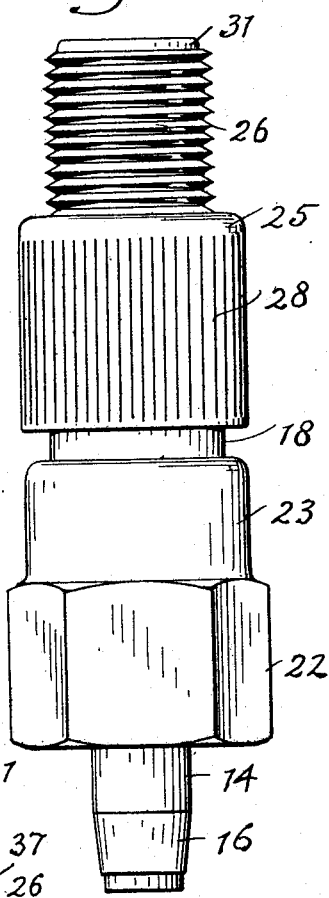
Fig. 3 is an elevational view of the valve mechanism.
Figure 2:
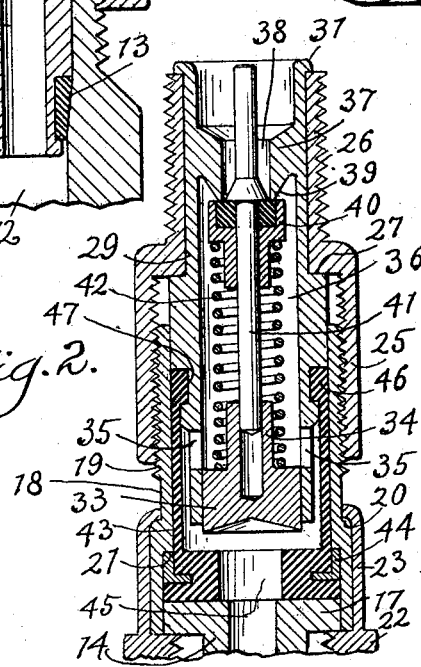
Fig. 2 is a fragmentary view similar to Fig. 1, but showing the valve mechanism in the opened or unseated position.

An internally threaded nut 25 is screwed upon the threaded end 19 of the sleeve 18 and has a reduced externally threaded extension 26 at its outer end, an internal shoulder 27 being formed by the provision of the extension 26. The outside of the internally threaded portion of the nut 25 is knurled, as shown at 28 in Fig. 3, to facilitate the opening and closing of the valve mechanism.

A plunger member, indicated generally at 29 is arranged in the nut 25 being swively connected thereto by a shoulder 30 bearing against the internal shoulder 27 of the nut and by an outturned annular flange 31 bearing upon the end of the extension 26 of the nut. The plunger 29 adjacent its inner end is contracted radially inwardly, as shown at 32, and has fitted therein a plug 33, from which extends a centrally arranged projection 34. The contracted portion 32 is likewise provided with a series of circumferentially spaced openings 35.

The plunger 29 has a central bore 36 closed at one end by the plug 33, the projection 34 of which extends into the bore, while adjacent the other end of the bore is an inwardly projecting flange 37 forming a reduced opening 38 and being provided on its inner side with a narrow edged, downwardly extending valve seat 39. A check valve 40 is arranged in the plunger 29 so as to normally seat on the seat 39, this check valve being carried by a pin 41 extending through the reduced opening 38 to a point adjacent the outer end of the bore of the plunger and also inwardly of the plunger into an axial recess in the plug 33 and projection 34 thereof, within which recess the pin 41 has a sliding fit. Surrounding the projection 34 and bearing upon the end of the plug 33 is a spring 42 which surrounds at its other end a projecting portion of the check valve and serves to normally maintain such valve in engagement with its seat 39. It is clear from the construction that the spring 42 is guided and seated at one end by the formation of the check valve and at its other end is similarly guided and seated by the formation of the plug 33. It is also clear that the valve pin is positively guided by its engagement in the axial recess in the plug 33 and its extension 34, and that because of this guiding of the spring and the stem the operation of the check valve will be positive and accurate.

Arranged in the sleeve 18 is a rubber cup 43, such cup having its bottom bearing upon the upper side of the enlarged head 17 of the positioning member 14 and being provided with an annular metallic ferrule or ring 44 arranged externally of the cup so that the upper edge of the ring bears against the internal shoulder 21 of the sleeve and thereby prevents the bottom of the cup from being unseated by the stretch of its walls when the valve is opened. The bottom of the cup is provided with a central opening 45 in alignment with the bore 15 through the positioning member 14, while the upper end of the rubber cup has an inwardly extending enlarged wall portion 46 seating in an annular groove 47 formed in the plunger 29.

As previously stated, the valve mechanism is assembled upon the valve stem by inserting the positioning member 14 into the bore of the stem and then screwing the nut 22 down upon the externally threaded reduced portion 11 of the valve stem. The nut 22, being swivelled to the sleeve 18, moves the latter toward the valve stem and also forces the positioning member into the stem without rotation until the packing 16 seats upon the tapered portion 13 of the stem. The knurled nut 25 is then rotated to move the plunger 29 inwardly until the end of the plug 33 firmly seats upon the bottom of the rubber cup 43 and thereby closes the opening 45 through the bottom of the rubber cup. The check valve 40 is also maintained in contact with its seat 39 and serves as an additional check against the escape of air. Likewise, the employment of the rubber cup furnishes a further adequate seal against the escape of air since when the plunger is in the position referred to the walls of the cup are compressed into close engagement with the inner wall of the sleeve 18, while the bottom of the cup is pressed by the plug 33 into tight engagement with the enlarged head of the positioning member and with the wall of the sleeve.

When it is desired to inflate the tire or to determine the air pressure therein, the knurled nut 25 is rotated in the opposite direction, thus moving the plunger outwardly and unseating the plug 33 from the bottom of the rubber cup, whereupon the air is free to pass through the opening 45 and the openings 35 into the bore 36 of the plunger. As soon as the air gauge or the air chuck is positioned upon the end of the valve mechanism, the pin 41 will be depressed against the tension of the spring 42 and the valve 40 thus unseated, whereupon air may pass entirely through the valve mechanism into the valve stem or, oppositely, from the valve stem and through the valve mechanism. The upper end of the knurled nut 25, being externally threaded, forms a convenient means for connecting a hand pump or a dust cap thereto.

Since the valve mechanism is mounted externally of the valve stem upon the end of the stem, the mechanism may be formed of parts of substantial size thereby increasing the ruggedness of the parts and reducing to a minimum the wear upon said parts by the use of the mechanism. Furthermore, since the positioning member and the rubber cup are assembled upon the valve stem by movement axially thereof, it will be seen that wear upon these parts is less than if the entire valve mechanism were rotated in assembling the same upon the valve stem.

Although a preferred embodiment of the invention has been illustrated and described herein, it should be understood that the same is susceptible of such modifications and adaptations as fall within the scope of the appended claims.

Having thus described my invention, I claim:

1. A valve mechanism of the type adapted to be secured upon the end of a valve stem comprising a sleeve, a gasket within said sleeve, and a movable plunger slidable within said sleeve, said plunger having a longitudinal bore closed at one end by a plug adapted to cooperate with said gasket and having a projection, said plunger also being provided intermediate its ends with a valve seat, a valve pin arranged in the bore of the plunger having one end sliding in a recess in the projection on said plug and being provided intermediate its ends with a valve having a projection, and a spring surrounding said pin and the projections on the plug and valve, said spring seating upon said plug and valve and maintaining the latter in engagement with the valve seat.

2. A valve mechanism of the type adapted to be secured upon the end of a valve stem comprising a sleeve, a cup-shaped gasket within said sleeve having an opening in its bottom wall, and a movable member associated with said sleeve and having a plunger adapted to close said opening in the gasket, said gasket being provided with a thickened upper edge and said plunger being provided with a groove within which said enlarged edge seats.

In testimony whereof, I hereunto affix my signature.

JOHN C. CROWLEY.